United States Patent [19]

Sekihata et al.

[11] Patent Number: 5,237,569
[45] Date of Patent: Aug. 17, 1993

[54] METHOD AND SYSTEM FOR TRANSMITTING HDLC DATA VIA ATM NETWORK

[75] Inventors: Osamu Sekihata; Tetsuo Nishino, both of Kawasaki, Japan

[73] Assignee: Fujitsu Limited, Kawasaki, Japan

[21] Appl. No.: 778,368

[22] Filed: Oct. 17, 1991

[30] Foreign Application Priority Data

Oct. 18, 1990 [JP] Japan .................. 2-280325

[51] Int. Cl.⁵ .............................. H04J 3/02
[52] U.S. Cl. .......................... 370/94.1; 370/79
[58] Field of Search .................. 370/94.1, 79

[56] References Cited

U.S. PATENT DOCUMENTS 4,979,169 12/1990 Almond et al. .................. 370/79 X
5,007,045 4/1991 Tsuzuki .......................... 370/94.1
5,072,441 12/1991 Szwarc .......................... 370/94.1 X

FOREIGN PATENT DOCUMENTS 54-59012 5/1979 Japan .
61-251344 8/1986 Japan .
61-280140 10/1986 Japan .
62-146042 6/1987 Japan .

OTHER PUBLICATIONS

CCITT Recommendations X.1-X.32 related to Data Communication Network: Services and Facilities, Interfaces.

Primary Examiner—Douglas W. Olms
Assistant Examiner—Russell W. Blum
Attorney, Agent, or Firm—Staas & Halsey

[57] ABSTRACT

A method of transmits HDLC data which is in conformance with a high-level data link control procedure via an asynchronous transfer mode network. The method includes the steps of deleting at least flags from the HDLC data before assembling ATM cells which are transmitted via the asynchronous transfer mode network, disassembling the ATM cells which are received via the asynchronous transfer mode network, and inserting at least flags to the disassembled ATM cells to restore the original HDLC data.

20 Claims, 10 Drawing Sheets

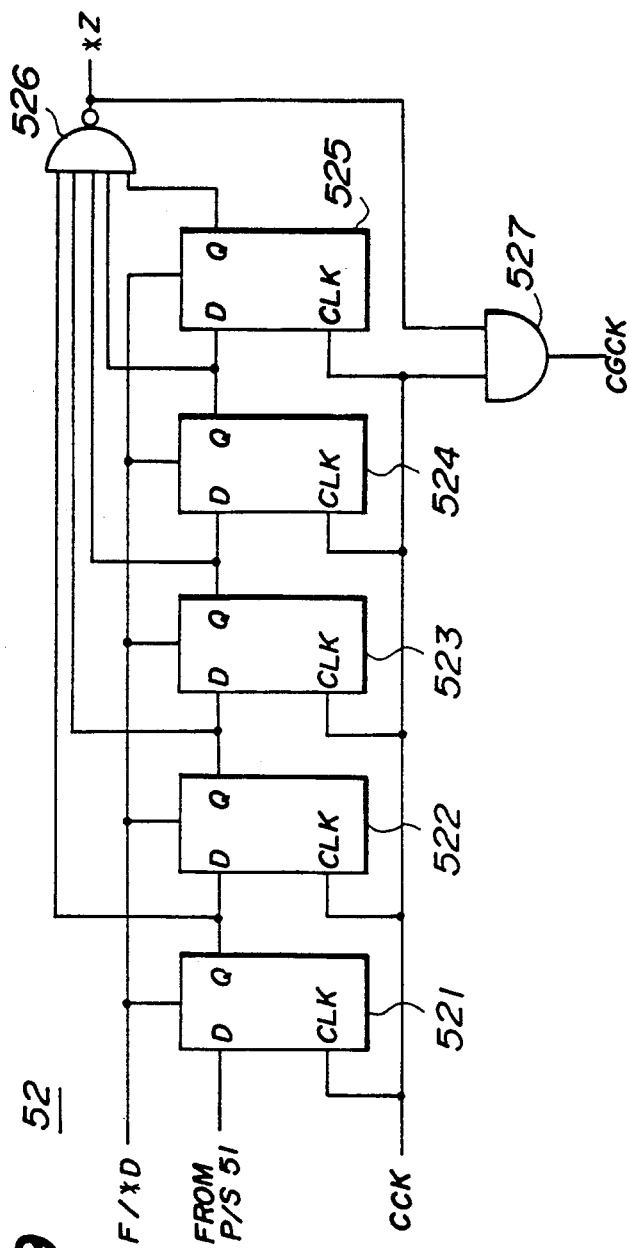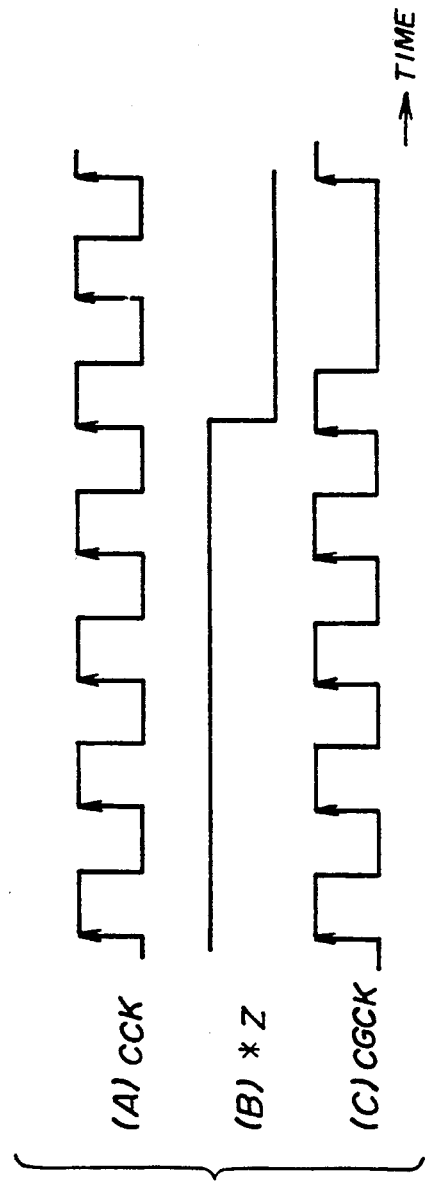
FIG.9
FIG.10

METHOD AND SYSTEM FOR TRANSMITTING HDLC DATA VIA ATM NETWORK

BACKGROUND OF THE INVENTION

The present invention generally relates to methods and systems for transmitting data in conformance with the high-level data link control (HDLC) procedure (hereinafter simply referred to as HDLC data), and more particularly to a method and a system for transmitting the HDLC data via an asynchronous transfer mode (ATM) network.

Recently, there is active research on the use of the ATM network as a broadband integrated services digital network (ISDN). Various kinds of information including voice and data may be transmitted via the ATM network. On the other hand, the data transmission employing the HDLC procedure prescribed by the CCITT Recommendations is popular, and it is desirable that the HDLC data can be transmitted via the ATM network with a satisfactory efficiency.

The HDLC procedure is a flag synchronization transmission control procedure. In other words, information having an arbitrary bit length is regarded as a transfer unit called a frame, and the HDLC procedure enables transfer of continuous information in frames.

FIG. 1 shows the structure of a HDLC frame, and FIG. 2 shows an example of a transfer of the HDLC data.

In the HDLC frame shown in FIG. 1, one frame is made up of a flag F having a bit structure "01111110", a 1-byte address field A, a 1-byte control field C, an n-byte information field I (n is an arbitrary integer), a 2-byte frame check sequence FCS, and a flag F.

As shown in FIG. 2, the flags F are transferred between the transfers of the HDLC frames HDLC1 through HDLC4 for synchronization purposes. In addition, in order to prevent a bit pattern identical to that of the flag F from occurring within the frame, a bit "0" is forcibly inserted after 5 consecutive "1"s. The inserted "0" is deleted at a receiving apparatus to restore the original data. Furthermore, according to the HDLC procedure, there is a rule to transmit a predetermined number (7 or more) consecutive "1"s if aborting the data transmission.

On the other hand, the conventional circuit switching system (that is, the synchronous transfer mode or STM) sets a path by fixedly assigning the band to be used. For this reason, the band utilization efficiency is poor in that the band is unused when the path is not used. But in the case of the ATM, digital data are sectioned into cells which have a fixed length, and the cells are transmitted only when the information is generated. Each cell is made up of a 5-octet header and a 48-octet information field, that is, a total of 53 octets.

FIG. 3 shows the structure of the ATM cell. As shown, one ATM cell is made up of 53 octets (bytes) in total, and the first 5 octets form the ATM header while the remaining 48 octets form the information field. The ATM header is used to transfer information including a virtual path identifier VPI, a virtual channel identifier VCI and head error check HEC. The 48-octet information field is provided with a 2-octet adaptation header and a 2-octet adaptation trailer which include information related to control, in addition to the data field.

When transmitting the above described HDLC data via the ATM network, the frame data and the flags between the two successive frames will have to be disassembled into ATM cells before inputting the same to the ATM network. When outputting the ATM cells from the ATM network, the ATM cells will have to be assembled and converted back to the original HDLC data.

However, in the HDLC data, the flags and the "0" inserted after five consecutive "1"s are not real data. Therefore, there is a problem in that information other than the real data is transmitted if the HDLC data is simply disassembled into the ATM cells and input to the ATM network, and there is a demand to improve the data transmission efficiency.

SUMMARY OF THE INVENTION

Accordingly, it is a general object of the present invention to provide a novel and useful method and system for transmitting HDLC data via an ATM network, in which the above described problem is eliminated.

Another and more specific object of the present invention is to provide a method of transmitting HDLC data which is in conformance with a high-level data link control procedure via an asynchronous transfer mode network, comprising the steps of deleting at least flags from the HDLC data before assembling ATM cells which are transmitted via the asynchronous transfer mode network, disassembling the ATM cells which are received via the asynchronous transfer mode network, and inserting at least flags to the disassembled ATM cells to restore the original HDLC data. According to the method of the present invention, it is possible to improve the transmission efficiency by not including the flags in the ATM cells.

Still another object of the present invention is to provide an ATM cell processing system for generating ATM cells from HDLC data which is in conformance with a high-level data link control procedure to transmit the ATM cells to an asynchronous transfer mode network and for restoring the HDLC data from the ATM cells which are received from the asynchronous transfer mode network, comprising flag deleting means for deleting at least flags from the HDLC data, ATM cell assembling means, coupled to the flag deleting means, for assembling ATM cells from the HDLC data without the flags and for transmitting the ATM cells via the asynchronous transfer mode network, ATM cell disassembling means, coupled to the asynchronous transfer mode network, for disassembling the ATM cells which are received via the asynchronous transfer mode network, and flag inserting means, coupled to the ATM cell disassembling means, for inserting at least flags to the disassembled ATM cells to restore the original HDLC data. According to the ATM cell processing system of the present invention, it is possible to improve the transmission efficiency by not including the flags in the ATM cells.

A further object of the present invention is to provide a communication system comprising an asynchronous transfer mode network, a plurality of terminal adapters coupled to the asynchronous transfer mode network, and a terminal equipment, coupled to each of the terminal adapters, for communicating with each terminal adapter employing a high-level data link control procedure, where the terminal adapter includes an ATM cell processing part for generating ATM cells from HDLC data which is in conformance with the high-level data link control procedure and is received from the terminal equipment to transmit the ATM cells to the asynchronous transfer mode network and restoring the HDLC data from the ATM cells which are received from the asynchronous transfer mode network. The ATM cell processing part comprises flag deleting means for deleting at least flags from the HDLC data, ATM cell assembling means, coupled to the flag deleting means, for assembling ATM cells from the HDLC data without the flags and for transmitting the ATM cells via the asynchronous transfer mode network, ATM cell disassembling means, coupled to the asynchronous transfer mode network, for disassembling the ATM cells which are received via the asynchronous transfer mode network, and flag inserting means, coupled to the ATM cell disassembling means, for inserting at least flags to the disassembled ATM cells to restore the original HDLC data. According to the communication system of the present invention, it is possible to transmit the HDLC data in the form of the ATM cells with a high transmission efficiency by not including the flags in the ATM cells.

Other objects and further features of the present invention will be apparent from the following detailed description when read in conjunction with the accompanying drawings.

BRIEF DESCRIPTION OF THE DRAWINGS

FIG. 9 is a circuit diagram showing an embodiment of a 5 consecutive "1"s detector shown in FIG. 8;

FIG. 10 is a timing chart for explaining the operation of the 6 consecutive "1"s detector shown in FIG. 9;

DESCRIPTION OF THE PREFERRED EMBODIMENTS

First, a description will be given of an operating principle of the present invention, by referring to FIG. 4.

Figure 4:
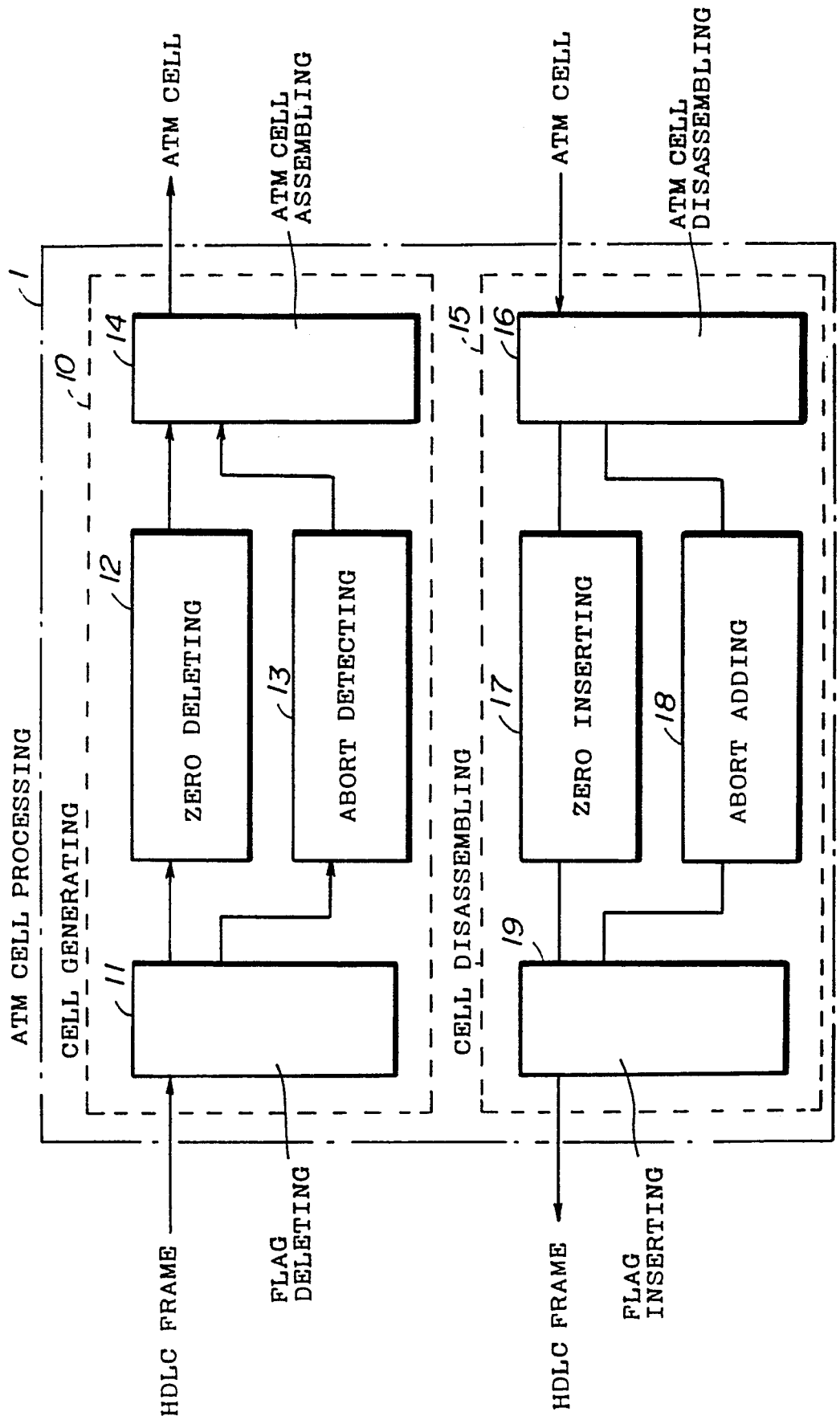
FIG. 4 is a system block diagram for explaining an operating principle of the present invention.

An ATM cell processing part 1 shown in FIG. 4 is made up of a cell generating part 10 and a cell disassembling part 15. The cell generating part 10 includes a flag deleting part 11, a zero deleting part 12, an abort detecting part 13 and an ATM cell assembling part 14 which are connected as shown. On the other hand, the cell disassembling part 15 includes an ATM cell disassembling part 16, a zero inserting part 17, an abort adding part 18 and a flag inserting part 19 which are connected as shown.

The cell generating part 10 deletes the flag and deletes the "0" which is inserted after 5 consecutive "1"s when assembling the ATM cells from the HDLC data, so as to transmit only the real data in the form of the ATM cells. The cell disassembling part 15 disassembles the ATM cells and inserts the deleted flag and the deleted "0" when restoring the HDLC data.

When the HDLC frame is input to the ATM cell processing part 1, the flag deleting part 11 of the cell generating part 10 deletes the flag when the flag is detected. The data from which the flag is already deleted may be supplied as it is to the ATM cell assembling part 14. However, it is also possible to first supply the data having no flag to the zero deleting part 12 so as to delete the "0" after 5 consecutive "1"s before supplying the data to the ATM cell assembling part 14.

When the flag is deleted in the flag deleting part 11 or the "0" after the 5 consecutive "1"s is deleted in the zero deleting part 12, it becomes impossible to judge an abort at the terminal of the other party from 7 or more consecutive "1"s even if the abort is generated. For this reason, the abort detecting part 13 detects the abort from the HDLC system and notifies the abort to the ATM cell assembling part 14 when the abort is detected. For example, a control bit for indicating abort information is provided within an adaptation header in the information field of the ATM cell shown in FIG. 3, and the abort is indicated by setting this control bit to "1".

When restoring the ATM cells back to the HDLC data, the ATM cells input to the cell disassembling part 15 of the ATM cell processing part 1 are connected in the ATM cell disassembling part 16. Then, the zero inserting part 17 inserts a "0", similarly as in the case of the "0" insertion normally carried out in the HDLC procedure. In addition, the control bit within the adaptation header of the ATM cell and indicating the abort is identified, and the abort adding part 18 is activated if the control bit is "1". The abort adding part 18 supplies to the flag inserting part 19 7 or more "1"s which indicate the abort when the abort adding part 18 is activated.

The flag inserting part 19 receives the output of the zero inserting part 17 and adds a flag to the beginning and end of the data, so as to generate the HDLC frame. In addition, the flag inserting part 19 inserts one or more flags between two successive HDLC frames. Furthermore, the flag inserting part 19 outputs the abort signal from the abort adding part 18 immediately when the abort signal is received.

Figure 5:
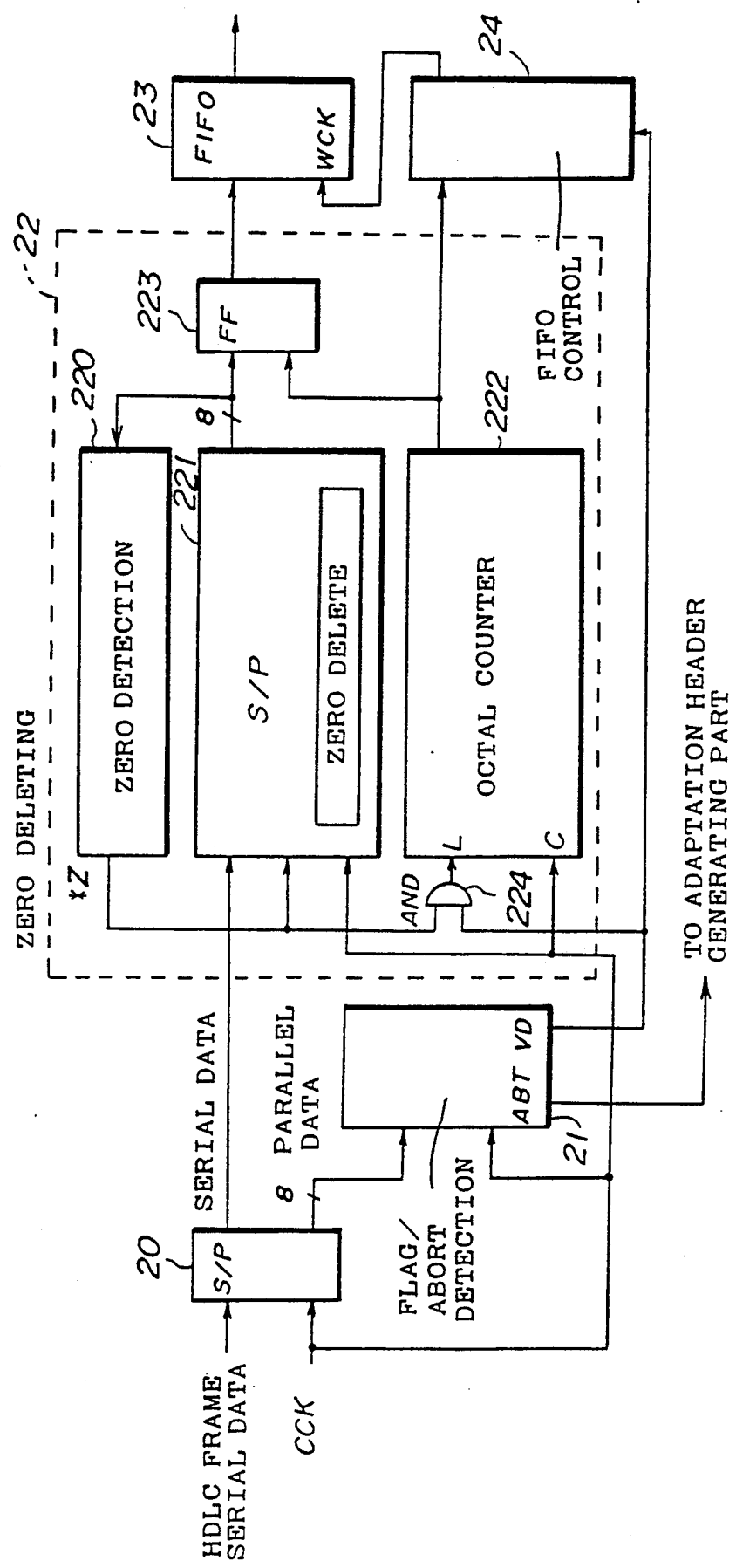
FIG. 5 is a system block diagram showing a first embodiment of an ATM cell processing system according to the present invention.

Next, a description will be given of a first embodiment of an ATM cell processing system according to the present invention, by referring to FIG. 5. FIG. 5 shows the construction of the cell generating part 10.

The cell generating part 10 shown in FIG. 5 can carry out the functions of the flag deleting part 11, the zero deleting part 12, the abort detecting part 13 and the ATM cell assembling part 14 shown in FIG. 4. The cell generating part 10 shown in FIG. 5 generally includes a serial-parallel (S/P) converting circuit 20, a flag/abort detection circuit 21, a zero deleting part 22, a first-in-first-out (FIFO) 23 and a FIFO controller 24.

The HDLC frame is converted into parallel data by the S/P converting circuit 20 and is supplied to the flag/abort detection circuit 21. On the other hand, the HDLC frame is supplied as it is in the form of serial data to the zero deleting part 22.

Figure 6:
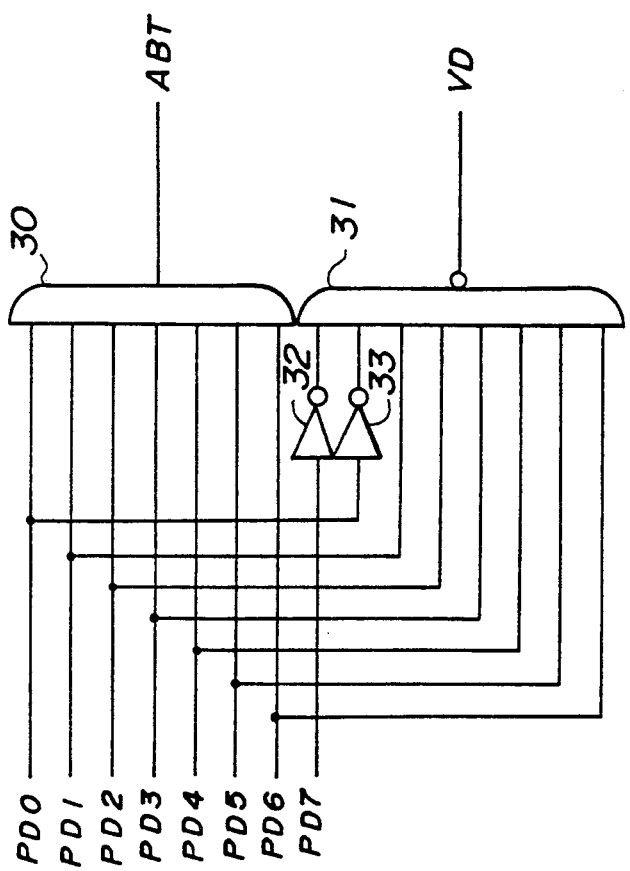
FIG. 6 is a circuit diagram showing an embodiment of a flag abort detection circuit shown in FIG. 5.

FIG. 6 shows an embodiment of the flag/abort detection circuit 21. The flag/abort detection circuit 21 includes an AND circuit 30, a NAND circuit 31, and inverters 32 and 33 which are connected as shown. The AND circuit 30 generates an abort detection signal ABT when all of the parallel output bits PD0 through PD7 of the S/P converting circuit 20 are "1". On the other hand, the NAND circuit 31 generates a "1" as an effective data detection signal VD when the first and last bits PD7 and PD0 are both "0" and the remaining bits are all "1". In other words, an invalid data is indicated when the effective data detection signal VD is "0".

In FIG. 5, the abort detection signal ABT from the flag/abort detection circuit 21 is supplied to an adaptation head generating part (not shown) to set a specific control bit to "1".

The zero deleting part 22 shown in FIG. 5 includes a zero detection circuit 220, a serial-parallel (S/P) converting circuit 221, an octal counter 222, a register 223 and an AND circuit 224 which are connected as shown. The register 223 is made up of 8 stages of flip-flop circuits.

The S/P converting circuit 220 converts an incoming serial HDLC data including flags into 8 parallel bits. The octal counter 222 counts pulses of a clock CCK. The 8 parallel bits output from the S/P converting circuit 221 are set in the register 223 in response to an output of the octal counter 222 when the octal counter 222 counts 8 pulses of the clock CCK.

The octal counter 222 has a terminal L for receiving an output of the AND circuit 224. The octal counter 222 stops the counting operation when the AND circuit 224 outputs a signal "0" in response to the effective data detection signal VD which is "0" and is output from the flag/abort detection circuit 21 when the flag is detected. Accordingly, the flag is not set in the register 223 when the flag is detected, and the flag will not be transmitted in the ATM cells.

Figure 7:
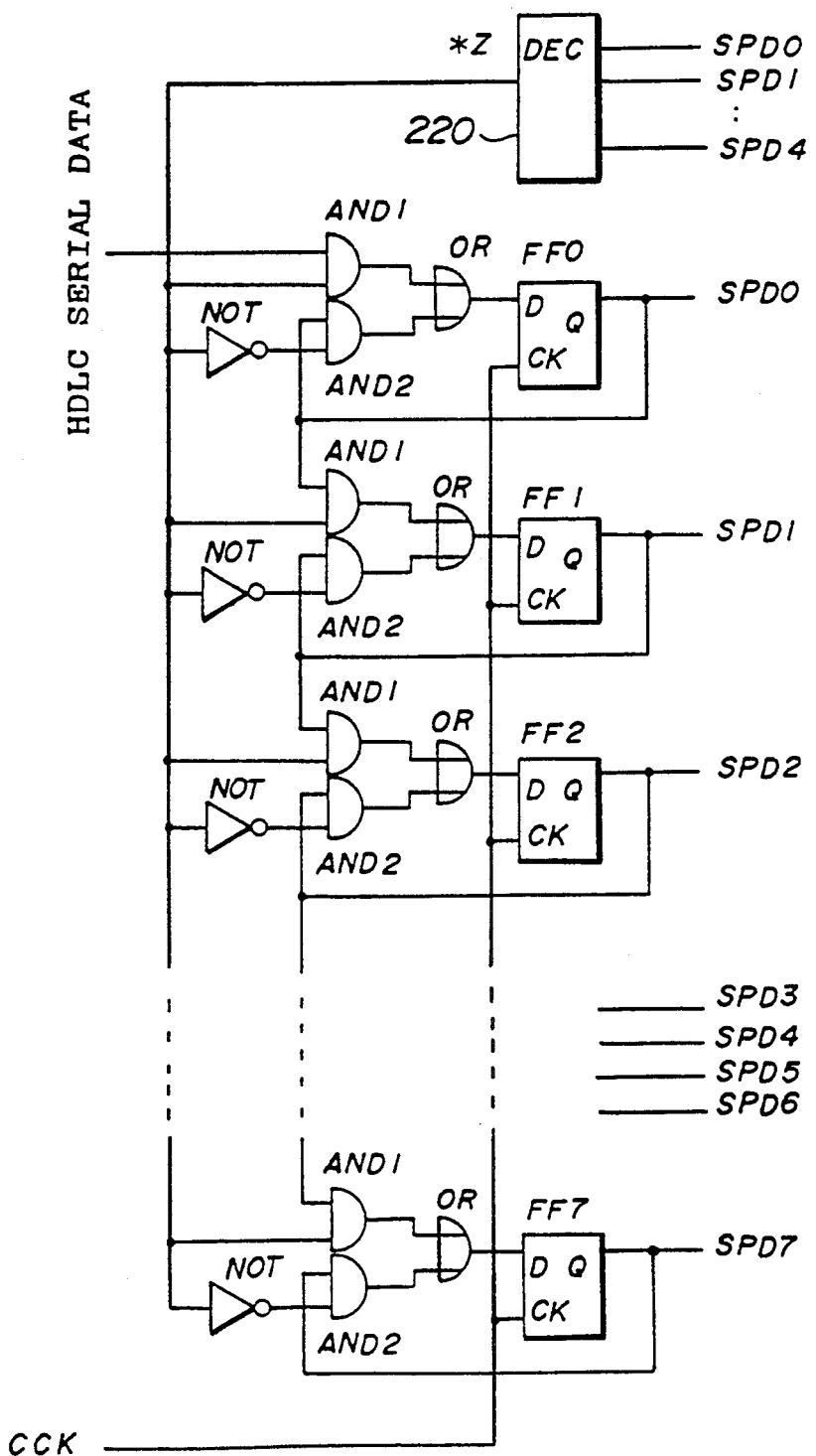
FIG. 7 is a circuit diagram showing an embodiment of an essential part of a zero deleting part shown in FIG. 5.

FIG. 7 shows an embodiment of an essential part of the zero deleting part 22. The zero detection circuit 220 and the S/P converting circuit 221 of the zero deleting part 22 are shown in FIG. 7.

In FIG. 7, 5 bits SPD0 through SPD4 from the S/P converting circuit 221 are input to a decoder 220 which functions as the zero detection circuit 220. This decoder 220 outputs an instruction signal *Z. The instruction signal *Z is "0" to instruct the deletion of "0" when all of the bits SPD0 through SPD4 are "1", that is, when 5 consecutive bits are "1". The instruction signal *Z is otherwise "1".

The S/P converting circuit 221 includes an inverter NOT, AND circuits AND1 and AND2, an OR circuit OR, and a flip-flop FFi for each parallel data bit SPDi, where i=0, 1, 2, . . . , 7. The parallel data bits SPD0 through SPD7 are respectively output from Q-output terminals of the flip-flops FF0 through FF7.

When the instruction signal *Z is "1", the first input bit of the serial HDLC data is input to a data terminal D of the flip-flop FF0 via the AND circuit AND1 and the OR circuit OR which are provided on the input side of the flip-flop FF0 in synchronism with the clock CCK, and is set in the flip-flop FF0. When the second bit of the serial HDLC data is set in the flip-flop FF0 and the previously set data is shifted, the output SPD0 of the flip-flop FF0 is supplied to the flip-flop FF1 via the AND circuit AND1 and the OR circuit OR which are provided on the input side of the flip-flop FF1 and is set in the flip-flop FF1 in synchronism with the clock CCK. Similarly, when the 8 bit data of the serial HDLC data are successively shifted and set in the flip-flops FF0 through FF7, the bits SPD0 through SPD7 are stored in the register 223 shown in FIG. 5 in response to the output of the octal counter 222.

On the other hand, the decoder (zero detection circuit) 220 shown in FIG. 7 receives the bit data which are successively shifted in the flip-flops FF0 through FF4 and are output as the bits SPD0 through SPD4. The decoder 220 generates the instruction signal *Z which is "0" immediately when 5 "1"s are included in the 8 parallel bits output from the S/P converting circuit 221. When the instruction signal *Z is "0", the AND circuits AND1 are closed, and as a result, a signal "1" output from each inverter NOT is supplied to the corresponding AND circuit AND2. Therefore, the bit data (HDLC data "0") input to AND circuit AND1 provided on the input side of the flip-flop FF0 is not input to the flip-flop FF0. Instead, the AND circuits AND2 provided with respect to each of the flip-flops FF0 through FF7 are opened so that the outputs of the flip-flops FF0 through FF7 are set again in the respective flip-flops FF0 through FF7. Consequently, the "0" is deleted.

In the cell generating part 10 shown in FIG. 5, the 8 parallel bits output from the zero deleting part 22 are written into the FIFO 23 under the control of the FIFO controller 24, and the ATM cells are formed similarly as in the case of the conventional ATM cell formation. The illustration and description of a means for forming the ATM cells will be omitted in the present specification because such a means is known in the art.

Figure 8:
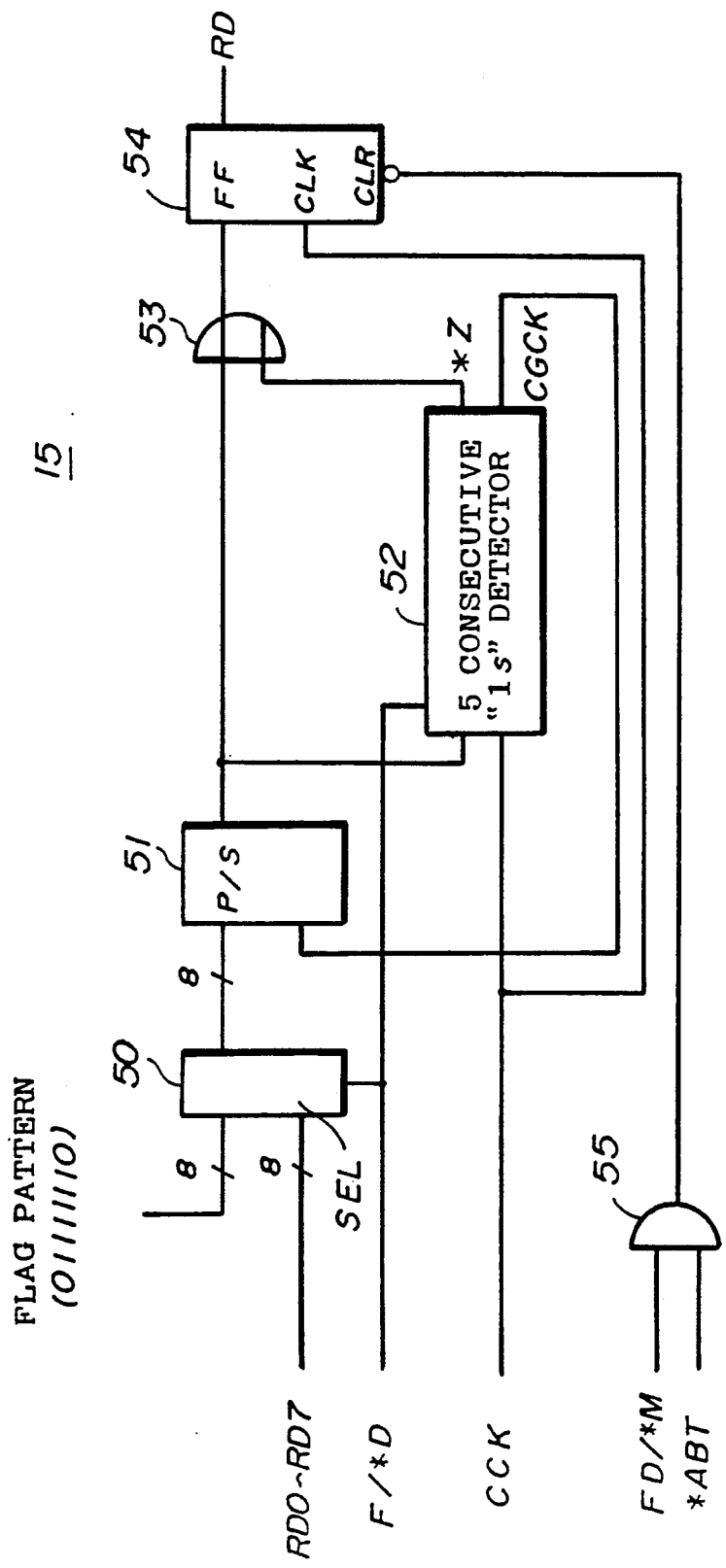
FIG. 8 is a circuit diagram showing an essential part of an embodiment of a cell disassembling part shown in FIG. 5.

FIG. 8 shows an essential part of an embodiment of the cell disassembling part 15. Means for processing or deleting the header, adaptation header, adaptation trailer and the like of the ATM cells is known, and an illustration and description thereof will be omitted in the present specification.

In FIG. 8, a selector 50, a parallel-serial (P/S) converting circuit 51, a 5 consecutive "1"s detector 52, an OR circuit 53, a flip-flop circuit 54 and and AND circuit 55 are connected as shown. The ATM cells which are received and have been subjected to the S/P conversion are input to the selector 50 in parallel as input data RD0 through RD7 on one hand. A flag pattern "01111110" is input to the selector 50 on the other. The selector 50 is controlled by a selector control signal F/*D which is generated based on the control information of the ATM cell including the header, the adaptation header and the adaptation trailer. The selector 50 selectively outputs the flag pattern when the selector control signal F/*D is "1", and selectively outputs the data RD0 through RD7 when the selector control signal F/*D is "0". Hence, the flag is added to the beginning and end of each HDLC frame, and between two successive HDLC frames.

The parallel output of the selector 50 is converted into a serial signal in the P/S converting circuit 51, and this serial signal is supplied to the flip-flop circuit 54 via the OR circuit 53. The serial signal is also supplied to the 5 consecutive "1"s detector 52. The 5 consecutive "1"s detector 52 generates a signal *Z which is "0" when 5 consecutive "1"s are detected, and this signal *Z is supplied to the flip-flop circuit 54 via the OR circuit 53, so that a "0" is inserted after the 5 consecutive "1"s. Since the "0" inserted after the 5 consecutive "1"s is deleted by the circuits shown in FIGS. 5 and 7, the deleted "0" is inserted so as to restore the original HDLC data.

When inserting the "0", the 5 consecutive "1"s detector 52 generates a clock CGCK based on the clock CCK. This clock CGCK stops the P/S conversion of the P/S converting circuit 51 when the 5 consecutive "1"s are detected, so that the "0" can be inserted after the 5 consecutive "1"s. The 5 consecutive "1"s detector 52 is enabled when the selector control signal F/*D is "0".

The AND circuit 55 receives the abort signal *ABT and a signal FD/*M. The abort signal *ABT is "0" when the abort is detected from the control bit within the adaptation header in the cell generating part 10 on the transmitting side. The signal FD/*M is "1" for the flag data and is "0" for the data. The AND circuit 55 thus outputs "0" when the abort signal *ABT is "0" to indicate the detection of the abort and the signal FD/*M is "0" to indicate the data. In this case, a clear terminal CLR of the flip-flop circuit 54 receives the signal "0" and the output RD of the flip-flop circuit 54 accordingly becomes "1". This output RD is the serial HDLC data.

FIG. 9 shows an embodiment of the 5 consecutive "1"s detector 52 shown in FIG. 8, and FIG. 10 is a timing chart for explaining the operation of the 5 consecutive "1"s detector 52.

The 5 consecutive "1"s detector 52 includes 5 flip-flops 521 through 525, a NAND circuit 526 and an AND circuit 527 which are connected as shown in FIG. 9. The flip-flops 521 through 525 are enabled when the signal F/*D is "0" to indicate the data, and the flip-flops 521 through 525 receive the clock CCK shown in FIG. 10(A). The data received from the P/S converting circuit 51 shown in FIG. 8 is successively shifted in the flip-flops 521 through 525 responsive to the clock CCK, and outputs of the flip-flops 521 through 525 are supplied to the NAND circuit 526. This NAND circuit 526 outputs the signal *Z shown in FIG. 10(B) which is "0" when 5 consecutive "1"s are detected, and this signal *Z is supplied to the flip-flop circuit 54 shown in FIG. 8 via the OR circuit 53, so that a "0" is inserted after the 5 consecutive "1"s. On the other hand, the AND circuit 527 generates the clock CGCK shown in FIG. 10(C) based on the clock CCK and the output signal *Z of the NAND circuit 526.

Next, a description will be given of the HDLC frame and the ATM cells, by referring to FIG. 11.

Figure 11:
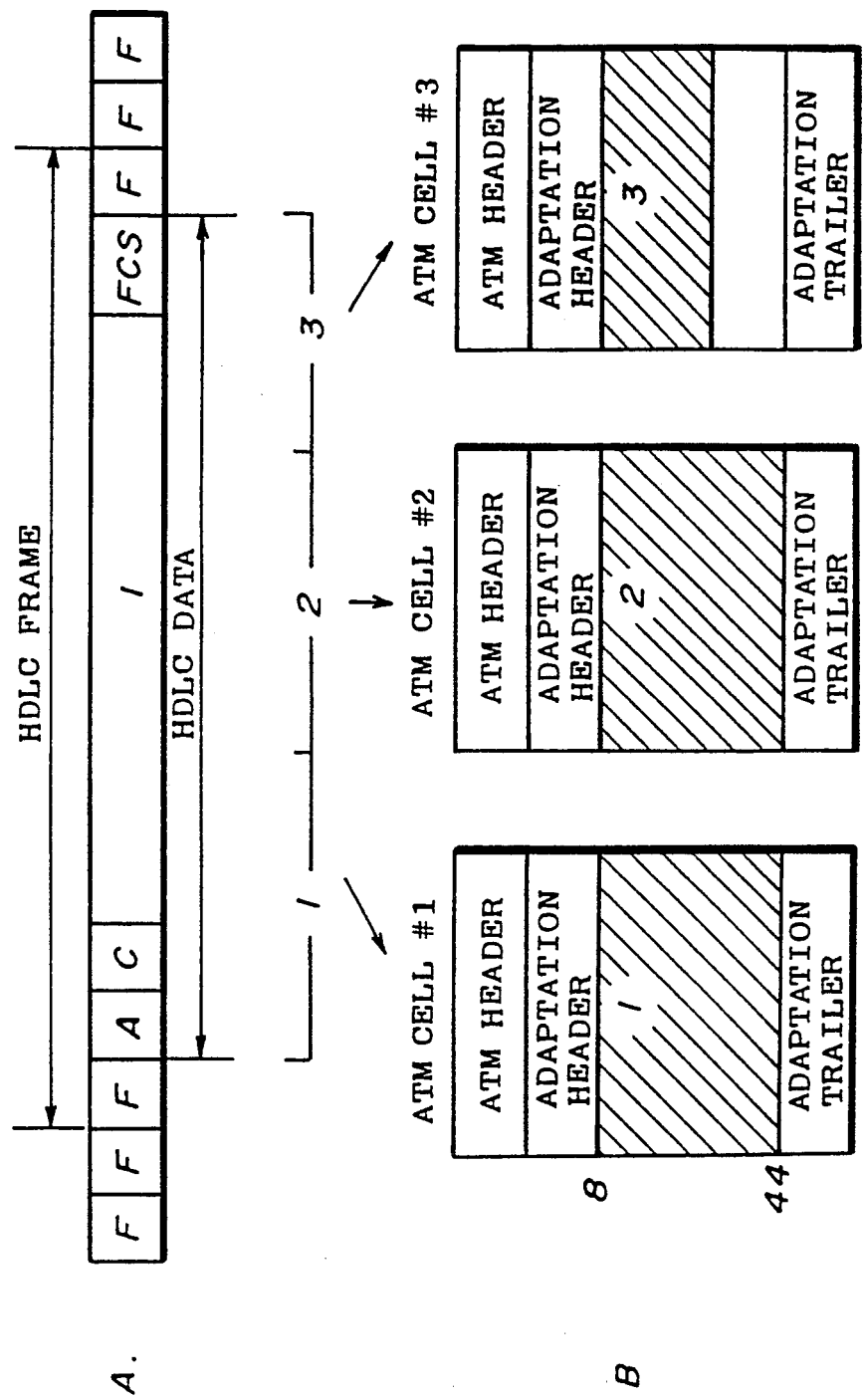
FIG. 11 is a diagram for explaining the HDLC frame and the ATM cells generated therefrom.

When the HDLC frame shown on the upper part of FIG. 11 is input to the cell generating part 10 shown in FIG. 5 together with the flags F inserted between the HDLC frames, the flags F are deleted and the HDLC data including the address A, the control field C, the information field I and the frame check sequence FCS is formed into the ATM cells. The HDLC data is divided for every 44 octets (bytes), thereby forming three data 1 through 3. The HDLC data included in the data 3 is less than 44 octets.

Each of the data 1 through 3 is inserted within the data field of the corresponding one of ATM cells #1 through #3 shown in the lower part of FIG. 11. Each of the ATM cells #1 through #3 has the structure shown in FIG. 3, and the control bit for indicating the abort is provided in the adaptation header. Such ATM cells #1 through #3 are processed in the cell disassembling part 15 shown in part in FIG. 8 and are restored back into the original HDLC frame.

Figure 1:
FIG. 1 shows the structure of a HDLC frame.
Figure 2:
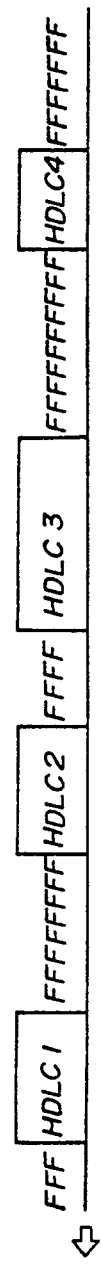
FIG. 2 shows an example of a transfer of HDLC data.
Figure 3:
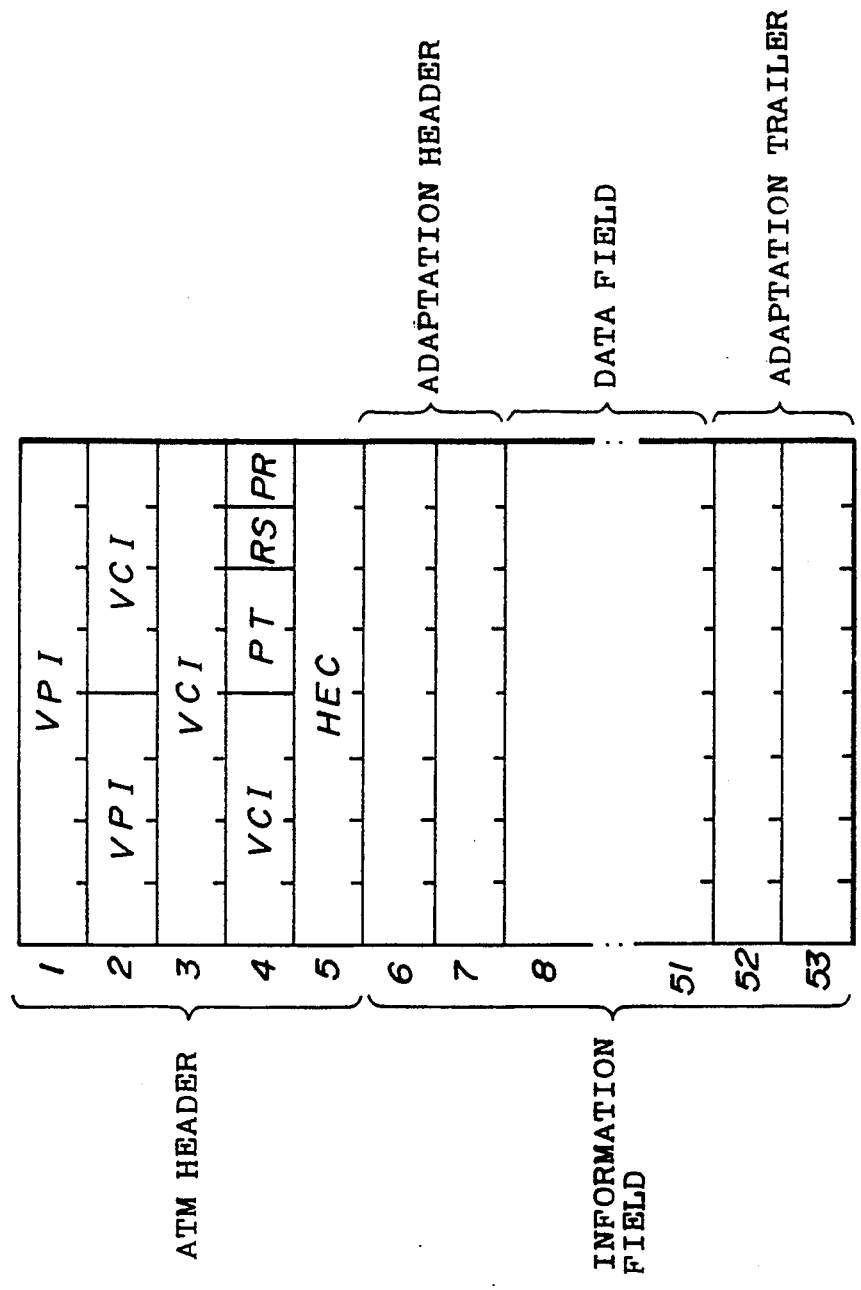
FIG. 3 shows the structure of an ATM cell.

When transmitting the ATM cells #1 through #3, the receiving apparatus must be able to recognize the position of each ATM cell within the series of ATM cells which are received. In the described embodiment, the first two bits of the adaptation header shown in FIG. 3 are used to indicate the position (or kind) of each ATM cell. For example, a single ATM cell may be indicated by "11", a first ATM cell may be indicated by "10", an intermediate ATM cell may be indicated by "00", and a last ATM cell may be indicated by "01".

In addition, it is preferable to indicate whether or not all of the data within the data field of the ATM cell are valid data, and to indicate which data are valid if not all of the data within the data field are valid data. For example, the data within the data field of the ATM cells #1 and #2 shown in FIG. 11 are all valid data. However, not all of the data within the data field of the ATM cell #3 are valid data, and dummy data or "0"s are inserted in a part of the data field which are unhatched in FIG. 11. In this case, the first six bits of the adaptation trailer of the ATM cell may be used to indicate the region of the data field occupied by the valid data.

Next a description will be given of a second embodiment of the ATM cell processing system according to the present invention, by referring to FIG. 12.

Figure 12:
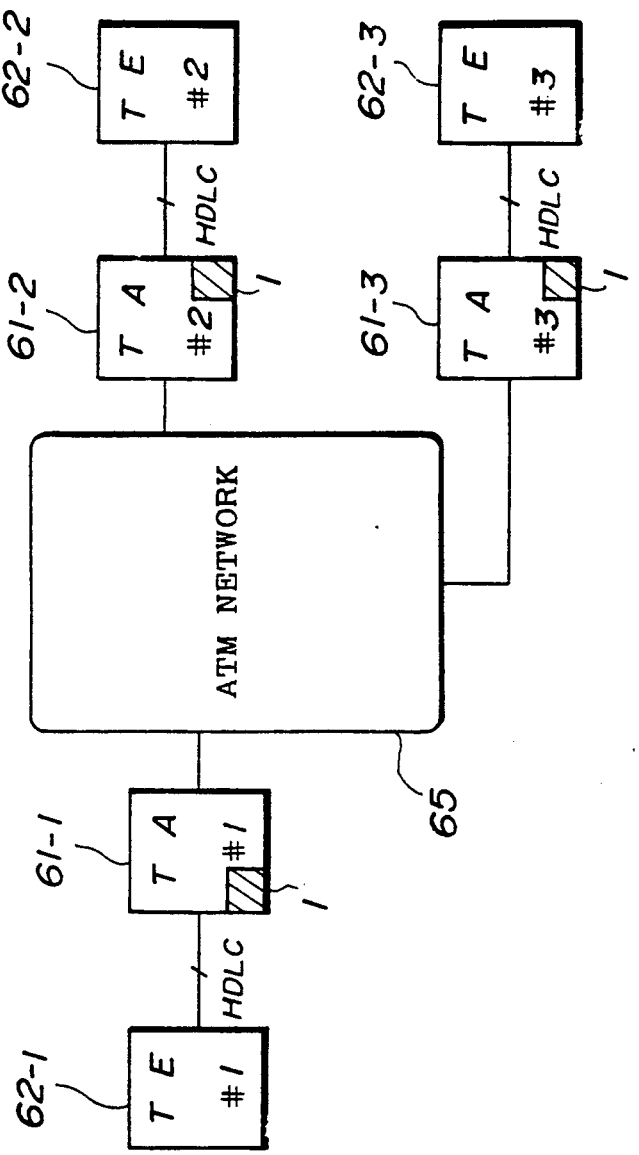
FIG. 12 is a system block diagram showing a second embodiment of the ATM cell processing system according to the present invention.

In FIG. 12, a plurality of terminal equipments 62-1 through 62-3 are coupled to an ATM network 65 via respective terminal adapters (or interfaces) 61-1 through 61-3. Each of the terminal equipments 62-1 through 62-3 employ the HDLC procedure, and the communication between the corresponding terminal equipment 62-j and terminal adapter 61-j (j=1, 2, 3) is carried out in conformance with the HDLC procedure. On the other hand, each of the terminal adapters 61-1 through 61-3 includes an ATM cell processing part 1 having the construction shown in FIG. 4, so that the HDLC data may be transmitted via the ATM network 65 in the form of ATM cells.

Therefore, according to this embodiment, only a slight modification is required in the terminal adapter to realize communication among the HDLC terminal equipments 62-1 through 62-3 via the ATM network 65.

Further, the present invention is not limited to these embodiments, but various variations and modifications may be made without departing from the scope of the present invention.

What is claimed is:

1. A method of transmitting HDLC data which is in conformance with a high-level data link control procedure via an asynchronous transfer mode network, said method comprising the steps of:
   (a) deleting at least flags from the HDLC data before assembling ATM cells which are transmitted with the flags deleted via the asynchronous transfer mode network;
   (b) disassembling the ATM cells which are received via the asynchronous transfer mode network; and
   (c) inserting at least flags to the disassembled ATM cells to restore the original HDLC data.

2. A method of transmitting HDLC data which is in conformance with a high-level data link control procedure, wherein a "0" is inserted after five consecutive "1"s of HDLC data to prevent a bit pattern identical to that of the flag from occurring within a frame of HDLC data, via an asynchronous transfer mode network, said method comprising the steps of:
   (a) deleting at least flags from the HDLC data before assembling ATM cells which are transmitted via the asynchronous transfer mode network and deleting each "0" inserted after five consecutive "1"s of the HDLC data;

(b) disassembling the ATM cells which are received via the asynchronous transfer mode network; and (c) inserting at least flags and a "0" to the disassembled ATM cells to restore the original HDLC data.

3. The method of transmitting HDLC data as claimed in claim 2, wherein a predetermined number of consecutive "1"s are inserted in the HDLC data to indicate an abort from a high-level data link control system, said step (a) further deletes the predetermined number of consecutive "1"s of the HDLC data and inserts abort information in a control bit within the ATM cell to indicate the abort, and said step (c) inserts the predetermined number of "1"s to the disassembled ATM cells depending on the abort information of the control bit to restore the original HDLC data.

4. The method of transmitting HDLC data as claimed in claim 3, wherein the ATM cell includes an ATM header and an information field, and the control bit is provided in an adaptation header within the information field of the ATM cell.

5. A method of transmitting HDLC data which is in conformance with a high-level data link control procedure via an asynchronous transfer mode network, said method comprising the steps of:

(a) inserting a predetermined number of consecutive "1"s in the HDLC data to indicate an abort from a high-level data link control system;

(b) deleting at least flags from the HDLC data before assembling ATM cells which are transmitted via the asynchronous transfer mode network, deleting the predetermined number of consecutive "1"s of the HDLC data and inserting abort information in a control bit within the ATM cell to indicate the abort;

(c) disassembling the ATM cells which are received via the asynchronous transfer mode network; and (d) inserting at least flags to the disassembled ATM cells and inserting the predetermined number of "1"s to the disassembled ATM cells depending on the abort information of the control bit to restore the original HDLC data.

6. The method of transmitting HDLC data as claimed in claim 5, wherein the ATM cell includes an ATM header and an information field, and the control bit is provided in an adaptation header within the information field of the ATM cell.

7. A method of transmitting HDLC data which is in conformance with a high-level data link control procedure via an asynchronous transfer mode network, said method comprising the steps of:

(a) deleting at least flags from the HDLC data before assembling ATM cells including at ATM header and an information field which are transmitted via the asynchronous transfer mode network, said information field including an adaptation header, a data field and an adaptation trailer, predetermined bits of the adaptation header being used to indicate a position of each ATM cell in a series of the ATM cells which are transmitted via the asynchronous transfer mode network;

(b) disassembling the ATM cells which are received via the asynchronous transfer mode network; and (c) inserting at least flags to the disassembled ATM cells to restore the original HDLC data.

8. The method of transmitting HDLC data as claimed in claim 7, wherein predetermined bits of the adaptation trailer are used to indicate a region of the data field occupied by valid data.

9. An ATM cell processing system for generating ATM cells from HDLC data which is in conformance with a high-level data link control procedure to transmit the ATM cells to an asynchronous transfer mode network and for restoring the HDLC data from the ATM cells which are received from the asynchronous transfer mode network, said ATM cell processing system comprising:

flag deleting means for deleting at least flags from the HDLC data;

ATM cell assembling means, coupled to said flag deleting means, for assembling ATM cells from the HDLC data without the flags and for transmitting the ATM cells without the flags via the asynchronous transfer mode network;

ATM cell disassembling means, coupled to the asynchronous transfer mode network, for disassembling the ATM cells which are received via the asynchronous transfer mode network; and flag inserting means, coupled to said ATM cell disassembling means, for inserting at least flags to the disassembled ATM cells to restore the original HDLC data.

10. An ATM cell processing system for generating ATM cells from HDLC data which is in conformance with a high-level data link control procedure to transmit the ATM cells to an asynchronous transfer mode network and for restoring the HDLC data from the ATM cells which are received from the asynchronous transfer mode network, wherein a "0" is inserted after five consecutive "1"s of the HDLC data to prevent a bit pattern identical to that of the flag from occurring within a frame of the HDLC data, said ATM cell processing system comprising:

flag deleting means for deleting at least flags from the HDLC data;

ATM cell assembling means, coupled to said flag deleting means, for assembling ATM cells from the HDLC data and for transmitting the ATM cells via the asynchronous transfer mode network;

ATM cell disassembling means, coupled to the asynchronous transfer mode network, for disassembling the ATM cells which are received via the asynchronous transfer mode network;

flag inserting means, coupled to said ATM cell disassembling means, for inserting at least flags to the disassembled ATM cells to restore the original HDLC data;

zero deleting means, coupled between said flag deleting means and said ATM cell assembling means, for deleting each "0" inserted after five consecutive "1"s of the HDLC data; and zero inserting means, coupled between said ATM cell disassembling means and said flag inserting means, for inserting a "0" to the disassembled ATM cells to restore the original HDLC data.

11. The ATM cell processing system as claimed in claim 10, wherein a predetermined number of consecutive "1"s are inserted in the HDLC data to indicate an abort from a high-level data link control system, and said ATM cell processing system further comprises:

abort detecting means, coupled between said flag deleting means and said ATM cell assembling means, for detecting the predetermined number of consecutive "1"s of the HDLC data and inserting abort information in a control bit within the ATM cell to indicate the abort; and abort adding means, coupled between said ATM cell disassembling means and said flag inserting means, for adding the predetermined number of "1"s to the disassembled ATM cells depending on the abort information of the control bit to restore the original HDLC data.

12. The ATM cell processing system as claimed in claim 11, wherein the ATM cell includes an ATM header and an information field, and the control bit is provided in an adaptation header within the information field of the ATM cell.

13. An ATM cell processing system for generating ATM cells from HDLC data which is in conformance with a high-level data link control procedure to transmit the ATM cells to an asynchronous transfer mode network and for restoring the HDLC data from the ATM cells which are received from the asynchronous transfer mode network, wherein a predetermined number of consecutive "1"s are inserted in the HDLC data to indicate an abort from a high-level data link control system, said ATM cell processing system comprising:

flag deleting means for deleting at least flags from the HDLC data;

ATM cell assembling means, coupled to said flag deleting means, for assembling ATM cells from the HDLC data and for transmitting the ATM cells via the asynchronous transfer mode network;

ATM cell disassembling means, coupled to the asynchronous transfer mode network, for disassembling the ATM cells which are received via the asynchronous transfer mode network;

flag inserting means, coupled to said ATM cell disassembling means, for inserting at least flags to the disassembled ATM cells to restore the original HDLC data;

abort detecting means, coupled between said flag deleting means and said ATM cell assembling means, for detecting the predetermined number of consecutive "1"s of the HDLC data and inserting abort information in a control bit within the ATM cell to indicate the abort; and abort adding means, coupled between said ATM cell disassembling means and said flag inserting means, for adding the predetermined number of "1"s to the disassembled ATM cells depending on the abort information of the control bit to restore the original HDLC data.

14. The ATM cell processing system as claimed in claim 13, wherein the ATM cell includes an ATM header and an information field, and the control bit is provided in an adaptation header within the information field of the ATM cell.

15. The ATM cell processing system as claimed in claim 9, wherein the ATM cell includes an ATM header and an information field, said information field includes an adaptation header, a data field and an adaptation trailer, and predetermined bits of the adaptation header are used to indicate a position of each ATM cell in a series of the ATM cells which are transmitted via the asynchronous transfer mode network.

16. The ATM cell processing system as claimed in claim 15, wherein predetermined bits of the adaptation trailer are used to indicate a region of the data field occupied by valid data.

17. The ATM cell processing system as claimed in claim 9, wherein the HDLC data is received from a terminal equipment, and said ATM cell processing system forms a part of a terminal adapter which is coupled between the terminal equipment and the asynchronous transfer mode network.

18. A communication system comprising:
an asynchronous transfer mode network;
a plurality of terminal adapters coupled to the asynchronous transfer mode network; and
a terminal equipment, coupled to each of the terminal adapters, for communicating with each terminal adapter employing a high-level data link control procedure,
each of said terminal adapters including an ATM cell processing part for generating ATM cells from HDLC data which is in conformance with the high-level data link control procedure and is received from the terminal equipment to transmit the ATM cells to the asynchronous transfer mode network and restoring the HDLC data from the ATM cells which are received from the asynchronous transfer mode network,
said ATM cell processing part comprising:
flag deleting means for deleting at least flags from the HDLC data;
ATM cell assembling means, coupled to said flag deleting means, for assembling ATM cells from the HDLC data without the flags and for transmitting the ATM cells without the flags via the asynchronous transfer mode network;
ATM cell disassembling means, coupled to the asynchronous transfer mode network, for disassembling the ATM cells which are received via the asynchronous transfer mode network; and
flag inserting means, coupled to said ATM cell disassembling means, for inserting at least flags to the disassembled ATM cells to restore the original HDLC data.

19. A communication system, comprising:
an asynchronous transfer mode network;
a plurality of terminal adapters coupled to the asynchronous transfer mode network; and
a terminal equipment, coupled to each of the terminal adapters, for communicating with each terminal adapter employing a high-level data link control procedure,
each of said terminal adapters including an ATM cell processing part for generating ATM cells from HDLC data which is in conformance with the high-level data link control procedure and is received from the terminal equipment to transmit the ATM cells to the asynchronous transfer mode network and restoring the HDLC data from the ATM cells which are received from the asynchronous transfer mode network, wherein a "0" is inserted after five consecutive "1"s of the HDLC data to prevent a bit pattern identical to that of the flag from occurring within a frame of the HDLC data,
said ATM cell processing part comprising:
flag deleting means for deleting at least flags from the HDLC data;
ATM cell assembling means, coupled to said flag deleting means, for assembling ATM cells from the HDLC data without the flags and for transmitting the ATM cells without the flags via the asynchronous transfer mode network;

ATM cell disassembling means, coupled to the asynchronous transfer mode network, for disassembling the ATM cells which are received via the asynchronous transfer mode network;

flag inserting means, coupled to said ATM cell disassembling means, for inserting at least flags to the disassembled ATM cells to restore the original HDLC data;

zero deleting means, coupled between said flag deleting means and said ATM cell assembling means, for deleting each "0" inserted after five consecutive "1"s of the HDLC data; and zero inserting means, coupled between said ATM cell disassembling means and said flag inserting means, for inserting a "0" to the disassembled ATM cells to restore the original HDLC data.

20. The communication system as claimed in claim 19, wherein a predetermined number of consecutive "1"s are inserted in the HDLC data to indicate an abort from a high-level data link control system, and said ATM cell processing part further comprises:

abort detecting means, coupled between said flag deleting means and said ATM cell assembling means, for detecting the predetermined number of consecutive "1"s of the HDLC data and inserting abort information in a control bit within the ATM cell to indicate the abort; and abort adding means, coupled between said ATM cell disassembling means and said flag inserting means, for adding the predetermined number of "1"s to the disassembled ATM cells depending on the abort information of the control bit to restore the original HDLC data.

* * * * *